United States Patent
Gradwohl et al.

(10) Patent No.: US 8,011,876 B2
(45) Date of Patent: Sep. 6, 2011

(54) WIND DRIVEN POWER GENERATOR

(76) Inventors: Donald R. Gradwohl, Albany, OR (US); Jonald R. Gradwohl, Corvallis, OR (US)

( * ) Notice: Subject to any disclaimer, the term of this patent is extended or adjusted under 35 U.S.C. 154(b) by 1351 days.

(21) Appl. No.: 11/586,803

(22) Filed: Oct. 25, 2006

(65) Prior Publication Data

US 2008/0101932 A1    May 1, 2008

(51) Int. Cl.
*F03D 7/06* (2006.01)
*F03D 11/04* (2006.01)

(52) U.S. Cl. ....... 415/4.2; 415/4.4; 416/197 A; 416/211; 416/244 R; 416/DIG. 6

(58) Field of Classification Search ............. 415/4.2, 415/4.4, 907; 416/9–10, 119, 197 A, 210 R, 416/210 A, 211, 244 R, 244 A, DIG. 6
See application file for complete search history.

(56) References Cited

U.S. PATENT DOCUMENTS

| | | | | |
|---|---|---|---|---|
| 211,393 A | * | 1/1879 | Frazier | 415/4.4 |
| 223,308 A | * | 1/1880 | Barker | 416/119 |
| 434,108 A | * | 8/1890 | Gatlin | 415/4.4 |
| 1,511,965 A | * | 10/1924 | Hennigh | 416/119 |
| 1,526,631 A | * | 2/1925 | Fagan | 416/9 |
| 5,332,925 A | | 7/1994 | Thomas | |
| 6,191,496 B1 | | 2/2001 | Elder | |
| 6,700,218 B2 | | 3/2004 | Saiz | |
| 7,056,082 B1 | * | 6/2006 | Taylor | 415/4.2 |
| 7,488,150 B2 | * | 2/2009 | Krippene | 415/4.2 |
| 2005/0025624 A1 | * | 2/2005 | Pierson | 416/197 A |

* cited by examiner

*Primary Examiner* — Christopher Verdier
(74) *Attorney, Agent, or Firm* — Teri G. Andrews

(57) ABSTRACT

A wind driven power generator has a rotational shroud assembly for maximizing wind input and a turbine assembly with a shaft that rotates within the shroud assembly. The shaft end extends through the base of the shroud assembly. The turbine assembly has elongate arms attached to the top portion of the shaft of the turbine assembly. Each arm is essentially perpendicular to the shaft and has a vertical wind blade attached to each of the arm ends and spaced equidistance apart around the shaft of the turbine assembly. The shroud assembly covers approximately half of the turbine assembly during rotation and maintains a windward direction for maximum wind on the blade fronts while shielding the back sides of the blades from the incoming wind.

14 Claims, 3 Drawing Sheets

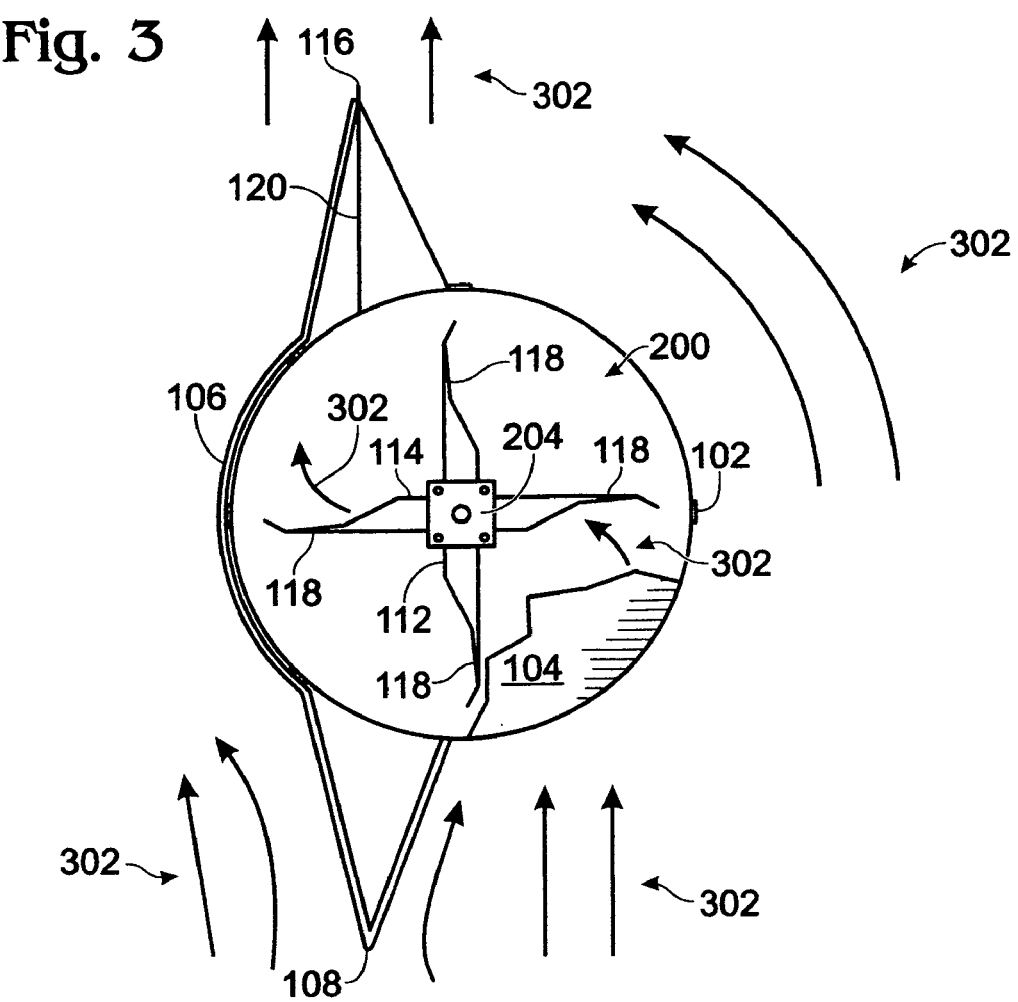
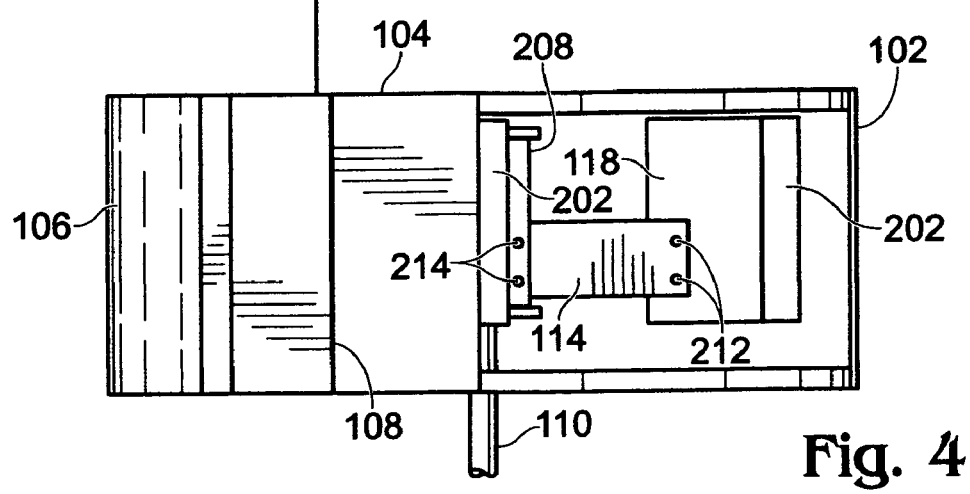

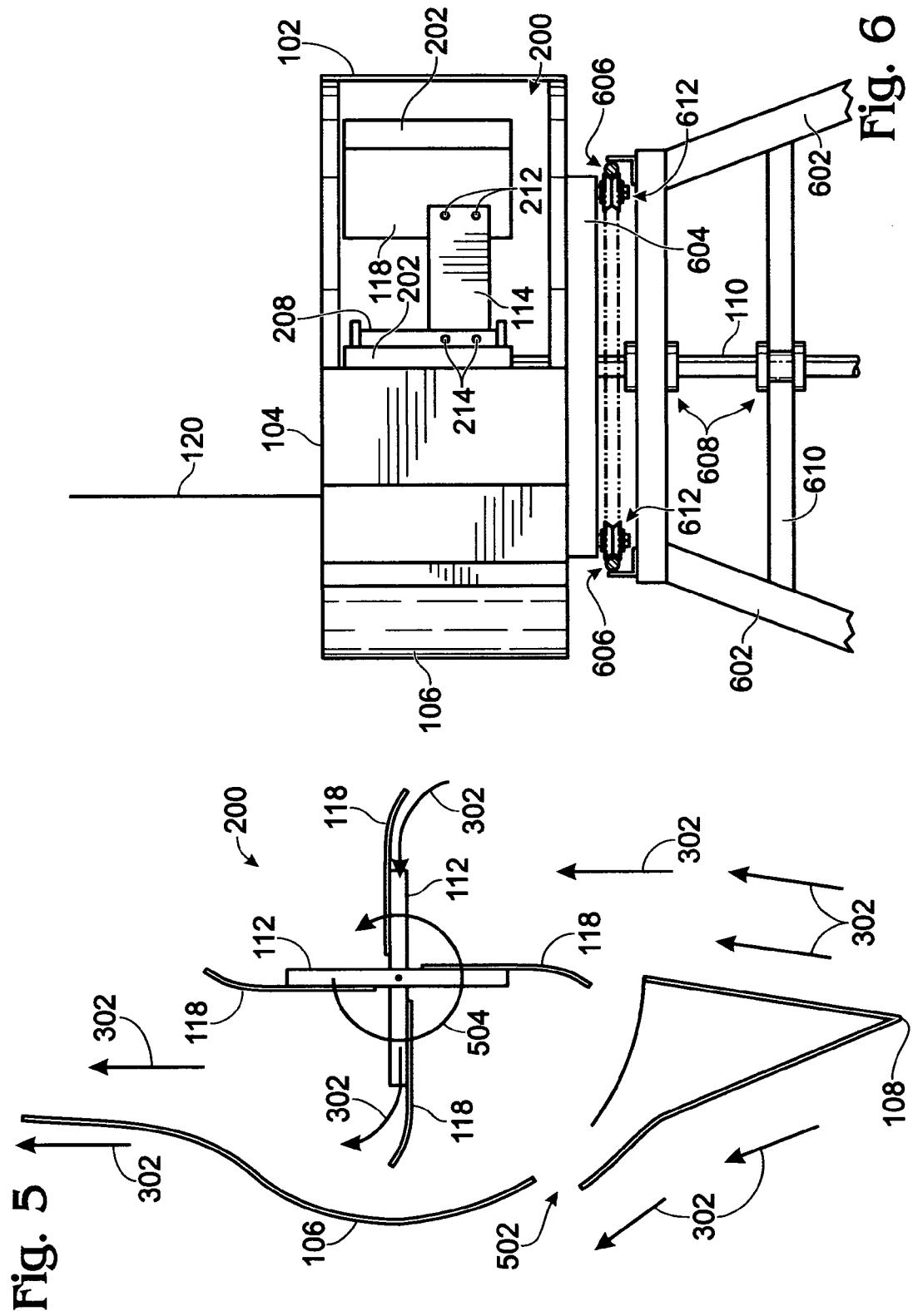

WIND DRIVEN POWER GENERATOR

BACKGROUND OF THE INVENTION

1. Field of the Invention

This invention relates to wind turbines used to convert wind energy to mechanical energy for electrical power generation and other power needs.

2. Prior Art

Wind driven power generators, or wind turbines, have been used to convert wind energy into mechanical energy or power for many years. Wind turbines provide a renewable and environmentally friendly source of power. In areas where there is a constant, high velocity wind presence, conventional wind turbines can provide economical electrical power. Wind turbines also provide electrical power in remote areas where power lines have not been installed.

The most common wind turbines have a horizontal axis and look somewhat like the common "wind mills." There are also some vertical axis systems but they are far less common. Typically, with currently technology, low wind speeds do not contribute to power production and high speed winds can potentially damage the system. In order to be cost effective, the current technology requires placement in areas that have fairly high wind velocity and consistent wind speeds. These operational restrictions leave a large amount of potential energy or power unused.

With current technology, there are many considerations that make the harnessing of wind power both difficult and cost prohibitive for the small scale or individual user. The systems used today are very large and expensive and typically require placement in areas having a very specific quantity and quality of wind. This very narrow wind requirement limits the usefulness of these systems to few areas.

There is a need for a wind driven power generator that is of a size and cost that allows a homeowner or small scale user to have an individual system, while on a larger scale provides a significantly more efficient and cost effective system than the current technology. This desired system must be more efficient at capturing wind and producing the desired energy at all wind speeds, directions, and conditions.

SUMMARY OF THE INVENTION

The present invention is a wind driven power generator that has a rotational shroud assembly that has a base portion that is attached to a plurality of rotational base guides. A structure base has an annular shaped receiving rotational track that the rotational base guides rotate within. There is a turbine assembly that includes a shaft that rotates within the shroud assembly which has a top portion and a shaft end. The shaft end extends through the base of the rotational shroud assembly and through the structure base. The top portion of the turbine assembly has at least one elongate arm that has a first arm end and a second arm end. The arm is attached to the shaft near the top portion of the turbine assembly and equidistance from the first arm end and the second arm end. Each arm is essentially perpendicular to the shaft of the turbine assembly. There is at least one vertical wind blade attached to each of the first arm ends and the second arm ends. Each of the wind blades has a wind side that incoming wind contacts and a back side opposite the wind side. The wind blades are spaced equidistance apart around the shaft of the turbine assembly.

The rotational shroud assembly covers approximately half of the turbine assembly throughout the rotation and shields the back side of the blades from the incoming wind during rotation. The turbine assembly rotates independently from the rotational shroud assembly and the shaft end is coupled to a rotational energy conversion device.

The present invention provides a wind driven power generator that can be constructed for large, commercial applications as well as on a much smaller scale for an individual home.

The present invention provides a wind driven power generator that operates in lower wind speeds than the current technology due to elimination of both wind force and drag on the return sides of the blades. This system has virtually no resistance to rotation.

BRIEF DESCRIPTION OF THE DRAWINGS

FIG. 3 is a top view of the wind driven power generator of the present invention.

FIG. 4 is a front view of the wind driven power generator of the present invention.

FIG. 5 is a top view of the wind driven power generator of the present invention.

FIG. 6 is a front view of the wind driven power generator of the present invention detailing the base portion.

DRAWINGS

Reference Numerals

100 Wind Driven Power Generator
102 Shroud Assembly Frame
104 Cover
106 Shroud
108 Shroud Front
110 Turbine Shaft
112 First Spoke/Arm
114 Second Spoke/Arm
116 Shroud Rear Edge
118 Wind Blade
120 Wind Direction Rudder
200 Turbine Assembly
202 Wind Blade Edge
204 Hub Frame Top
206 Hub Frame Base
208 Hub Vertical Members
210 Wind Blade Reinforcement
212 Wind Blade Attach Means
214 Spoke Attach Means
302 Wind Direction Arrows
502 Wind Pressure Relief Aperture
504 Rotational Direction
602 Structure Base
604 Rotational Base
606 Rotational Track
608 Bearings
610 Cross Support Member
612 Rotational Base Guides The above description and other objects, advantages, and features of the present invention will be more fully understood and appreciated by reference to the specification and accompanying drawings, wherein:

DETAILED DISCUSSION OF THE PREFERRED EMBODIMENTS

Referring to the figures, like elements retain their numerical indicators throughout the several views.

Figure 1:
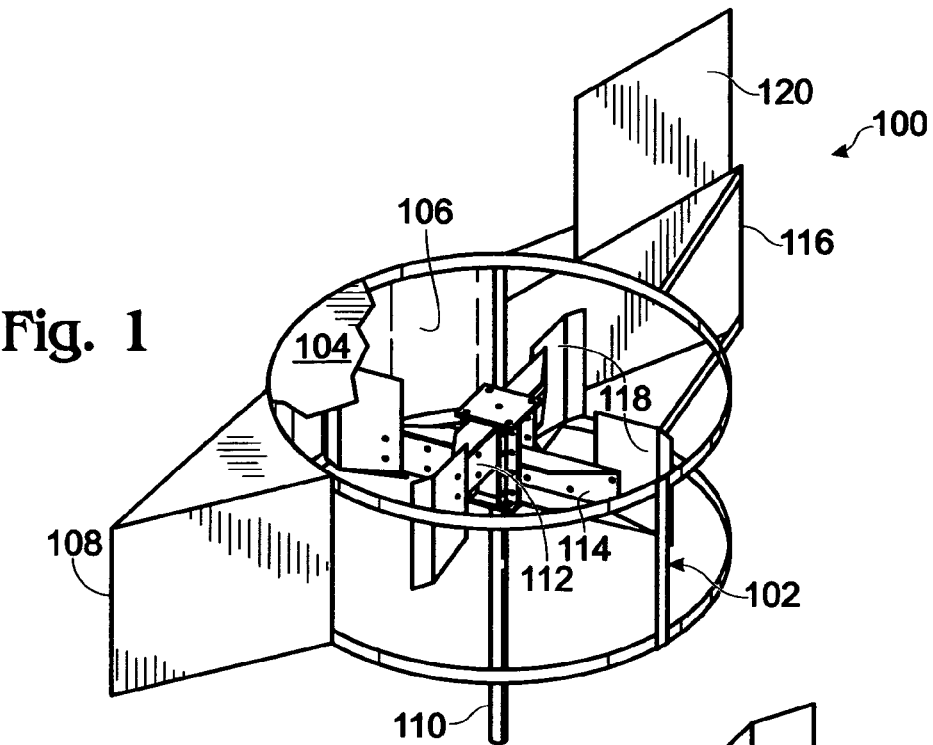
FIG. 1 is a perspective view of the preferred embodiment of the wind driven power generator of the present invention.

FIG. 1 is a perspective view of the preferred embodiment of Wind Driven Power Generator 100 of the present invention. Shroud Assembly Frame 102 is a partially open enclosure with the windward side open and the remaining sides and surfaces shrouded by Shroud 106. Shroud 106 has a Shroud Front 108 that points into the wind. Shroud 106 also has a Shroud Rear Edge 116 that deflects the wind from the leeward, or back, side of Wind Driven Power Generator 100.

In the preferred embodiment of the present invention, Wind Driven Power Generator 100 has a Shroud 106 attached to a portion of the perimeter of Shroud Assembly Frame 102. Cover 104 is attached to the top of Shroud Assembly Frame 102 and preferably covers approximately half of the top portion of Shroud Assembly Frame 102. Wind Direction Rudder 120 located near Shroud Rear Edge 116 assists in keeping Shroud Assembly Frame 102 in the optimum position to capture available wind. As the wind direction changes, Shroud Assembly Frame 102 rotates on Rotational Track 606 (not shown) which is affixed to Rotational Base 604 (shown and described in detail in FIG. 6). Approximately half of Shroud Assembly Frame 102 is covered around the perimeter by Shroud 106 and on the top by Cover 104.

In the preferred embodiment, rotating on Turbine Shaft 110 is a four-spoked turbine assembly. First Spoke/Arm 112 is shown extending from side-to-side within Wind Driven Power Generator 100 and has a Wind Blade 118 affixed to each extended end of First Spoke/Arm 112. Second Spoke/Arm 114 is shown essentially perpendicular to and below First Spoke/Arm 112 and also has a Wind Blade 118 affixed to each extended end.

Although the preferred embodiment shows two Spoke/Arms and four Wind Blade 118's, it has been contemplated that the Spoke/Arms can be as few as one and thereby the Wind Blade 118's as few as two. Additionally, greater than two Spoke/Arms and greater than four Wind Blade 118's may also be used to capture even more wind depending upon the application.

Figure 2:
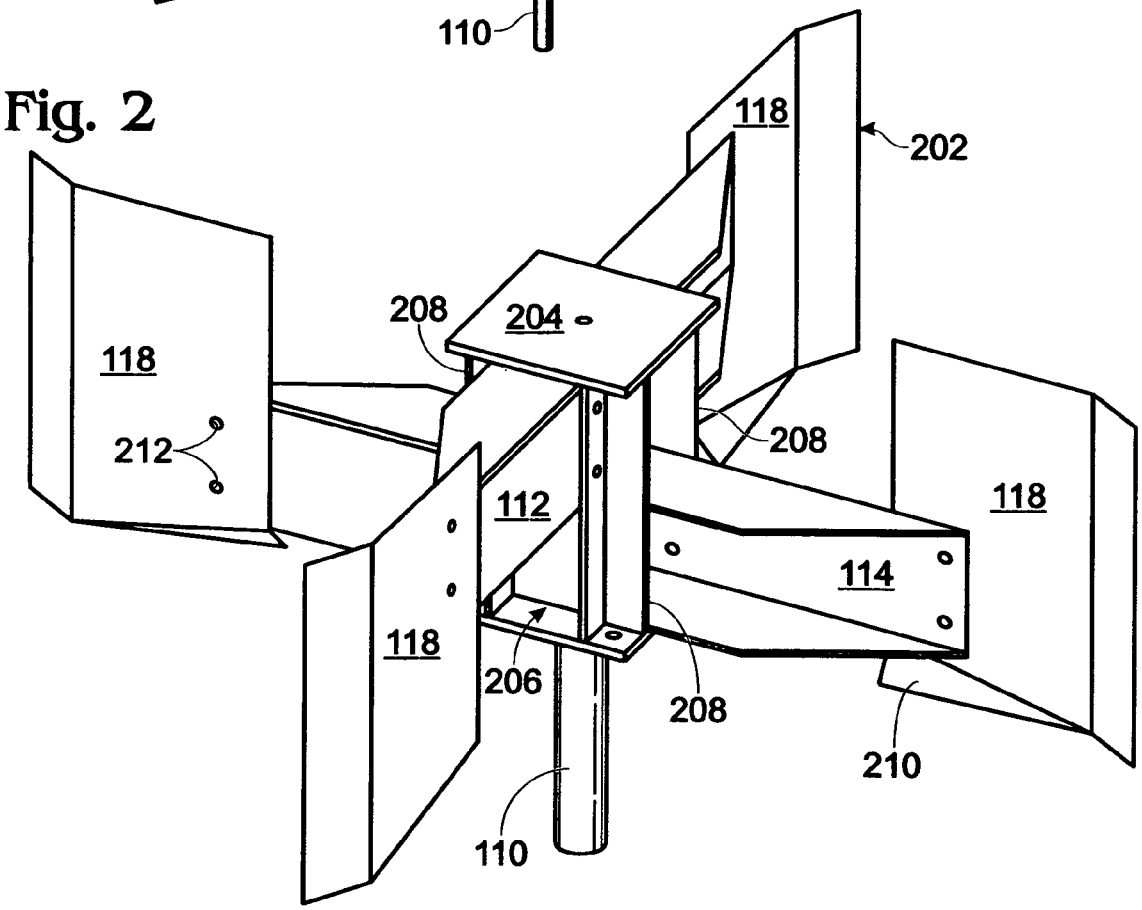
FIG. 2 is a more detailed view of the turbine assembly of the wind driven power generator of the present invention.

FIG. 2 is a more detailed view of the internal portion, or Turbine Assembly 200, of Wind Driven Power Generator 100 of the present invention. With the configuration of the wind turbine of the present invention, it is necessary to cover it in some way to avoid wind blowing on the backs of some of the blades thereby slowing the rotation being attempted by the wind on the fronts of others. Unlike any of the prior art, the current invention alleviates this problem by shrouding and covering Turbine Assembly 200 of Wind Driven Power Generator 100 with Shroud 106 and Cover 104. Additionally, by making First Spoke/Arm 112 and Second Spoke/Arm 114 hollow in form as in the preferred embodiment of the present invention, a portion of the incoming wind passes through the center of Shroud Assembly Frame 102 of Wind Driven Power Generator 100 thereby relieving the drag created by the negative pressure or vacuum on the face of the returning Wind Blades 118 (discussed in detail later).

First Spoke/Arm 112 and Second Spoke/Arm 114 are shown in the preferred embodiment to be a hollow, rectangular form, but have also been contemplated to be either a round or oval, hollow form. A Wind Blade 118 is attached to opposing ends of the Spoke/Arms with Wind Blade Attach Means 212. Wind Blade Attach Means 212 is shown in the preferred embodiment to be bolts, however various means such as welding, gluing, or riveting are examples of other attach means that would suffice.

Wind Blade 118 in the preferred embodiment has a Wind Blade Edge 202 that is angled slightly to both stiffen Wind Blade 118 as well as assist in catching or cupping the wind. Wind Blade 118 is preferably made of a light weight yet strong material such as titanium, thin steel, aluminum, or plastic that has been either formed or extruded to achieve the desirable shape. Wind Blade Reinforcement 210 of each Wind Blade 118 in the preferred embodiment is bent and attached to the Spoke/Arm as further stiffening means which also minimizes bending or deformation of Wind Blade 118. In the preferred embodiment, Wind Blade 118 is somewhat rectangular, but has also been contemplated to be round or oval. Additionally, where Wind Blade 118 is shown with Wind Blade Edge 202 assisting in capturing the wind, Wind Blade 118 has also been contemplated to be of a cupped form. Stiffening of Wind Blade 118 has also been contemplated to be a reinforcing rib either alone or in conjunction with Wind Blade Edge 202 and/or Wind Blade Reinforcement 210.

In the preferred embodiment, First Spoke/Arm 112 and Second Spoke/Arm 114 are hollow members and are specifically designed to have wind passing through them; therefore, they do not intersect one another but are stacked as shown in FIG. 2. Hub Vertical Members 208 extend between and are attached to Hub Frame Top 204 and Hub Frame Base 206 and have Spoke Attach Means 214 to further maintain the rigidity of the assembly by also attaching to Spoke/Arms 112 and 114. Hub Frame Base 206 is attached to Turbine Shaft 110. As previously discussed, more or less Spoke/Arms have been contemplated wherein Wind Blade 118's are equidistance apart regardless of the number.

An alternate embodiment has been contemplated where each Wind Blade 118 is attached to an arm section. Multiple blades and arm sections are equidistance and extend from a central hub assembly that has an open center. The open center serves as a plenum allowing incoming air to pass through the hub thereby relieving the potential negative pressure on the return side of each Wind Blade 118 as it rotates about the hub.

FIG. 3 is a top view of Wind Driven Power Generator 100 of the present invention further illustrating the path of the wind. Wind Direction Arrows 302 graphically describes the flow of air into and through Turbine Assembly 200 of Wind Driven Power Generator 100. It is important to note that the design of Wind Driver Power Generator 100 in the preferred embodiment never allows wind to apply pressure to the back portion of Wind Blade 118 as the back portion is protected by Shroud 106. As shown in FIG. 3, as Wind 302 passes through Second Spoke/Arm 114, it exits near Shroud Rear Edge 116 thereby relieving the drag that would be created by the negative pressure on the face of returning Wind Blade 118. This drag relief allows Wind Driven Power Generator 100 to turn more freely thereby functioning at very low wind speeds and more efficiently at all wind speeds.

FIG. 4 is a front view of Wind Driven Power Generator 100 of the present invention. Wind Direction Rudder 120 causes Shroud Front 102 of Wind Driver Power Generator 100 to always face into the wind. In the position shown in FIG. 4, only one end of Second Spoke/Arm 114 and attached Wind Blade 118 are exposed to the wind. The opposing end is protected from the wind, and thereby any opposing wind force, by Shroud 106. When Second Spoke/Arm 114 has rotated slightly off perpendicular to the wind, First Spoke/Arm 112 and its attached Wind Blade 118 will be caught by the wind and will further assist in the rotation.

FIG. 5 is a top view of an alternate embodiment of Wind Driven Power Generator 100 of the present invention detailing the wind's path and effect on the rotation of the system. Turbine Assembly 200 rotates in the direction of Rotational Arrow 504 as shown in FIG. 5.

Wind Direction Arrows 302 are shown entering the front of Wind Driven Power Generator 100 and forcing the system to turn in the direction of Rotation Direction Arrow 504. The wind is shown to not only impact Wind Blade 118 of First Spoke/Arm 112, but also to pass through the hollow center of First Spoke/Arm 112 thereby relieving the drag from the negative pressure created on the face of returning Wind Blade 118.

In this alternate embodiment shown in FIG. 5, Wind Pressure Relief Aperture 502 is shown proximate the middle portion of Shroud 106. Wind Pressure Relief Aperture 502 functions to relieve incoming wind pressure that could potentially impact the back side, or return side, of Wind Blade 118. Wind Pressure Relief Aperture 502 further assures that Turbine Assembly 200 rotates freely.

FIG. 6 is a front view of the Wind Driven Power Generator 100 of the present invention detailing the base portion of the system. Rotational Base 604 is fixedly attached to the bottom of Shroud Assembly Frame 102. On the bottom of Rotational Base 604 is Rotational Base Guides 612 that travel within the interior of Rotational Track 606. Rotational Track 606 is fixedly attached to Base Structure 602. In the preferred embodiment, Rotational Track 606 is an annular ring with a round cross-section and of an inner diameter that fits firmly against the outer edges of Rotational Base Guides 612. Clearly, Rotational Track 606 can be of any form or shape that will allow free rotation while firmly holding Rotational Base 604.

Structure Base 602 is attached to Rotational Track 606 and used to maintain the required rigidity of Wind Driven Power Generator 100 even during the highest wind conditions. Structural Base 602 is further supported by Cross Support Member 610. With a very large system, there may be multiple Cross Support Member 610's. Structural Base 602 could feasibly be mounted to a ground structure or to a structure on the top of a building or home.

As the wind direction changes, Wind Direction Rudder 120 causes the top, shrouded portion of Wind Driven Power Generator 100 to rotate into the wind maximizing wind into the system. Turbine Shaft 110, which is a part of Turbine Assembly 200, rotates independently from the shrouded portion and extends through Structure Base 602. As shown in FIG. 6, Bearings 608 allow Turbine Shaft 110 to rotate freely through the top portion of Structure Base and through Cross Member Support 610. Although two sets of Bearing 608's are shown, more will likely be required for larger or high production systems.

The base of Turbine Shaft 110 (not shown) is affixed to an electric power generator or any other device that has rotation power requirements such as pumps and the like.

Wherein the terms and expressions which have been employed in the foregoing specification are used therein as terms of description and not of limitation, there is no intention, in the use of such terms and expressions, of excluding equivalents of the features shown and described or portions thereof, it being recognized that the scope of the invention is defined and limited only by the claims which follow.

We claim:

1. A Wind Driven Power Generator, comprising:
a shroud having a rotational base fixedly attached to a plurality of rotational base guides;
a structure base having an annular shaped receiving rotational track that the rotational base guides rotate within;
a turbine shaft having a top portion and a shaft end, the shaft end extending through the rotational base of the shroud and through the structure base;
at least one elongate arm having a first arm end and a second arm end, the arm fixedly attached proximate the top portion of the turbine shaft equidistant from the first arm end and the second arm end, each of the at least one arm is essentially perpendicular to the turbine shaft, the at least one elongate arm is hollow, wherein a portion of the incoming wind is forced through the arm at the first arm end to the wind side of the wind blade at the second arm end thereby relieving a drag created by a negative pressure on the wind blade on the second arm end; and
a plurality of vertically oriented wind blades attached to each of the first arm end and the second arm end, each of the wind blades having a wind side, and a back side opposite the wind side, the wind blades spaced equidistantly apart around the turbine shaft;
wherein the shroud surrounds and covers approximately half of the at least one arm while rotating within the rotational base guides such that an opening in the shroud allows an incoming wind to contact the wind side of the wind blades exposed in the opening while the shroud shields the back side of each of the wind blades, the shaft rotates independently from the shroud and the shaft end is coupled to a rotational energy conversion device.

2. The Wind Driven Power Generator of claim 1, wherein the turbine shaft is vertical.

3. The Wind Driven Power Generator of claim 1, wherein the wind blades are rectangular.

4. The Wind Driven Power Generator of claim 1, wherein the wind side of the at least one wind blade is concave.

5. The Wind Driven Power Generator of claim 1, wherein each of the plurality of wind blades further comprise a wind blade edge bent slightly toward the wind side.

6. The Wind Driven Power Generator of claim 1, wherein the shroud has a wind pressure relief aperture for releasing incoming wind that could potentially impact the back side of the wind blades.

7. A Wind Driven Power Generator, comprising:
a shroud having a rotational base fixedly attached to a plurality of rotational base guides;
a structure base having an annular shaped receiving rotational track that the rotational base guides rotate within;
a turbine shaft having a top portion and a shaft end, the shaft end extending through the base portion of the shroud and through the structure base;
a hub assembly having a perimeter, a hub frame base, a hub frame top, a plurality of hub vertical members extending from the hub frame top to the hub frame base around the perimeter of the hub assembly, the hub base is fixedly attached to the shaft and proximate the top portion of the shaft,
at least one elongate arm having a first arm end and a second arm end opposite the first arm end, the arm extending through and fixedly attached to the hub assembly, and each of the at least one elongate arm is essentially perpendicular to the shaft, the first arm end and the second arm end extending equally from the hub assembly; and
a plurality of vertically oriented wind blades fixedly attached to each of the first arm end and the second arm end, each of the wind blades having a wind side that an incoming wind contacts, a back side opposite the wind side, and each of the wind blades spaced equidistantly apart around the perimeter of the hub assembly;
wherein the shroud rotates within the rotational base guides while enclosing and covering approximately half of the arms and the wind blades when in rotation and shielding the back side of the blades from the incoming wind during rotation, the shaft rotates by the incoming wind impacting the wind side of the wind blades and rotates independently from the shroud, and the shaft end is coupled to a rotational energy conversion device.

8. The Wind Driven Power Generator of claim 7, wherein the turbine shaft is vertical.

9. The Wind Driven Power Generator of claim 7, wherein the at least one elongate arm is hollow, wherein a portion of the incoming wind is forced through the arm at the first arm end to the wind side of the wind blade at the second arm end thereby relieving a drag created by a negative pressure on the wind blade on the second arm end.

10. The Wind Driven Power Generator of claim 7, wherein the shroud has a cover further comprising a wind direction rudder that is guided by the wind to maintain the shroud in a position that allows the incoming wind to impact the wind side of the wind blades and shielding the back side of the wind blades.

11. The Wind Driven Power Generator of claim 7, wherein the at least one wind blade is rectangular.

12. The Wind Driven Power Generator of claim 7, wherein the wind side of the at least one wind blade is concave.

13. The Wind Driven Power Generator of claim 7, wherein the plurality of wind blades further comprise a wind blade edge bent slightly toward the wind side.

14. The Wind Driven Power Generator of claim 7, wherein the shroud has a wind pressure relief aperture for releasing the incoming wind that could potentially impact the back side of the wind blades.

* * * * *